(12) United States Patent
Klaffki et al.

(10) Patent No.: US 10,697,409 B2
(45) Date of Patent: Jun. 30, 2020

(54) CONNECTION RING FOR REMOVABLE ATTACHMENT OF A FUEL SUPPLY UNIT ON A MOTOR VEHICLE TANK OPENING

(71) Applicant: Bayerische Motoren Werke Aktiengesellschaft, Munich (DE)

(72) Inventors: Heinz Klaffki, Poing (DE); Manfred Bigalke, Vaterstetten (DE); Guenther Tuschl, Kolbermoor (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 407 days.

(21) Appl. No.: 15/482,887

(22) Filed: Apr. 10, 2017

(65) Prior Publication Data

US 2017/0211531 A1    Jul. 27, 2017

Related U.S. Application Data

(63) Continuation of application No. PCT/EP2015/075572, filed on Nov. 3, 2015.

(30) Foreign Application Priority Data

Nov. 21, 2014    (DE) .................. 10 2014 223 842

(51) Int. Cl.
*F02M 37/10*    (2006.01)
*B60K 15/03*    (2006.01)
(Continued)

(52) U.S. Cl.
CPC ........... *F02M 37/103* (2013.01); *B60K 15/03* (2013.01); *F02M 37/007* (2013.01);
(Continued)

(58) Field of Classification Search
CPC ............ F02M 37/103; F02M 37/0017; F02M 37/007; F02M 37/10; F02M 37/0076;
(Continued)

(56) References Cited

U.S. PATENT DOCUMENTS 4,333,580 A * 6/1982 Sweigart, Jr. ......... E04H 1/1238
                                                      220/293
4,501,376 A * 2/1985 Bushby .............. B65D 43/0231
                                                      220/293
(Continued)

FOREIGN PATENT DOCUMENTS

DE    25 50 950 A1    5/1977
DE    41 28 128 A1    2/1993
(Continued)

OTHER PUBLICATIONS

International Search Report (PCT/ISA/210) issued in PCT Application No. PCT/EP2015/075572 dated Jan. 29, 2016 with English translation (seven pages).
(Continued)

*Primary Examiner* — Nathan Cumar
(74) *Attorney, Agent, or Firm* — Crowell & Moring LLP

(57) ABSTRACT

A connection ring is provided for removable attachment of a fuel supply unit on a fuel tank. The connection ring has a ring upper side, at least one attachment elevation which protrudes from the ring upper side, and at least one tool engagement region. The tool engagement region is constructed such that a torque from a tool can be transmitted onto the connection ring. At least one portion of the tool engagement region and one portion of the attachment elevation are at an equal distance from the center of the connection ring in the radial direction from the center.

17 Claims, 7 Drawing Sheets

(51) Int. Cl.
*F02M 37/00* (2006.01)
*F16L 27/087* (2006.01)

(52) U.S. Cl.
CPC ....... *F02M 37/0017* (2013.01); *F16L 27/087* (2013.01); *B60K 2015/03243* (2013.01); *B60K 2015/03453* (2013.01)

(58) Field of Classification Search
CPC .................. F02M 55/004; B60K 15/03; B60K 2015/03243; B60K 2015/03453; F16L 27/087
USPC ....................................................... 292/256.6
See application file for complete search history.

(56) References Cited

U.S. PATENT DOCUMENTS

| | | | | |
|---|---|---|---|---|
| 4,998,639 A | * | 3/1991 | Seizert | B60K 15/01 141/368 |
| 5,102,172 A | * | 4/1992 | Seizert | B60K 15/01 220/298 |
| 5,207,463 A | * | 5/1993 | Seizert | B60K 15/01 220/298 |
| 2010/0051621 A1 | | 3/2010 | Shimoda et al. | |

FOREIGN PATENT DOCUMENTS

| | | |
|---|---|---|
| EP | 0 838 360 A1 | 4/1998 |
| EP | 1 571 030 B1 | 4/2009 |

OTHER PUBLICATIONS

German-language Written Opinion (PCT/ISA/237) issued in PCT Application No. PCT/EP2015/075572 dated Jan. 29, 2016 (seven pages).

* cited by examiner

State of the Art

State of the Art

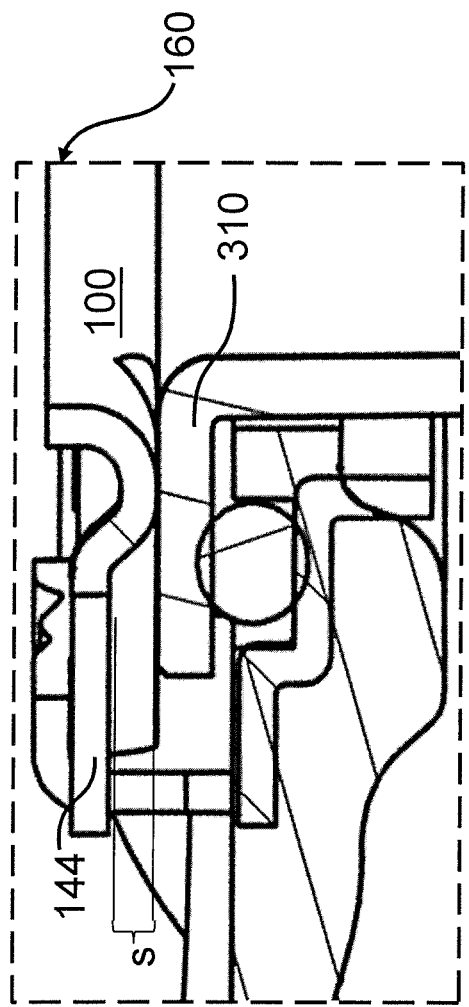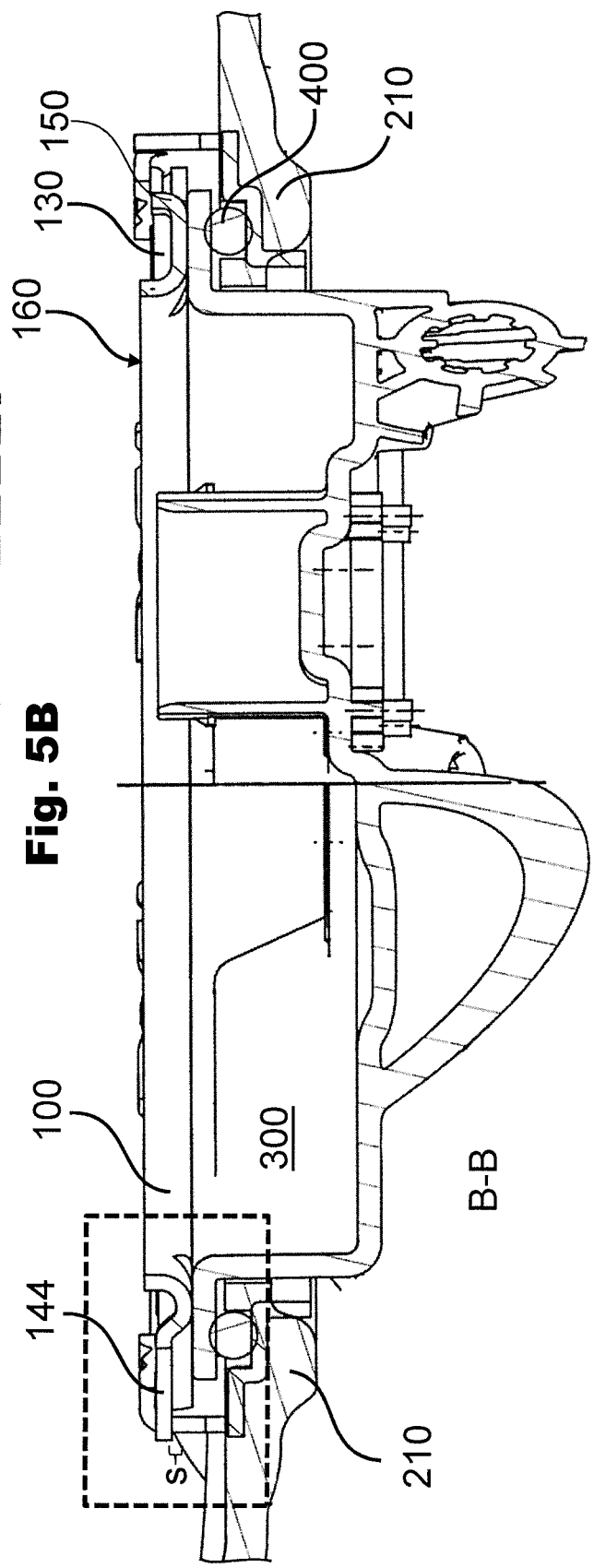
Fig. 5B
Fig. 5A

CONNECTION RING FOR REMOVABLE ATTACHMENT OF A FUEL SUPPLY UNIT ON A MOTOR VEHICLE TANK OPENING

CROSS REFERENCE TO RELATED APPLICATIONS

This application is a continuation of PCT International Application No. PCT/EP2015/075572, filed Nov. 3, 2015, which claims priority under 35 U.S.C. § 119 from German Patent Application No. 10 2014 223 842.0, filed Nov. 21, 2014, the entire disclosures of which are herein expressly incorporated by reference.

BACKGROUND AND SUMMARY OF THE INVENTION

The technology disclosed here relates to a connection ring for the removable attachment of a fuel supply unit on a motor vehicle tank opening.

Such connection rings, also called camlock rings, are known per se from the state of the art. European Patent Document EP 1 571 030 B1, for example, discloses a connection ring, which is also illustrated in FIGS. 1 and 2. The known connection ring 80 of FIG. 1 has a cap region 88, which is not shown in FIG. 2. The cap region 88 is fastened to the motor vehicle tank 20 by way of a flange region. The flange region is formed by an inner ring 82 and an outer ring 81 (compare FIG. 2).

A bayonet mechanism is used for the fastening. The bayonet mechanism comprises two movements: In a first movement, the connection ring 80 is placed onto the jaws 25 provided at the vehicle tank 20. The jaws 25 are introduced into wide introduction openings 83 of the flange region. During the placing of the connection ring 80, an outer edge 81a of the outer ring 81 takes over the positioning or guidance of the connection ring 80. During the placing of the connection ring 80, the outer edge 81a first comes in contact with the rounded edge 25a of the L-shaped jaw 25 and then slides along the rounded edge 25a and the shaft part of the jaw 25. Subsequently, in a second movement, the connection ring 80 is rotated in the circumferential direction U relative to the motor vehicle 20. As a result of the rotation, the fastening elevations 85 of the connection ring 80 slide under the jaws 25 until the fastening elevations 85 are held in the indentations provided in the jaws 25 (also compare FIGS. 6 and 7 of European Patent Document EP 1 571 030 B1). As a result of the rotation of the connection ring 80, the shaft part of the L-shaped jaws 25 arrives in the slot region 84, which is connected with the introduction region 83. FIG. 1 is a cross-sectional view in the rotated condition. In this rotated condition, the connection ring 80 presses the fuel supply unit 30 by way of the seal 40 onto the edge of the opening 21 of the motor vehicle tank 20.

Recesses 86 are provided at the outer ring 81. These recesses 86 are used as the contact surface for the mounting tool, by which the connection ring 80 is rotated. The mounting tool for rotating the connection ring 80 has several pins, which extend in the axial direction Z (compare FIG. 1), and engage behind the recesses 86. The engaging-behind prevents the tool from sliding off. Between the recess 86 and the fuel tank 20, an axial gap 5 (see FIG. 1) is provided for permitting the pins to engage behind the recesses 86.

A disadvantage of this known solution is the fact that the inner edge 82a of the inner ring 82 as well as the outer edge 81a of the outer ring 81 have to be provided with a sufficiently good production tolerance, so that, even when the installation space is comparatively small, the jaws 25 can be introduced and rotated without any problem. Furthermore, the connection ring requires a comparative large installation space. The size of the connection ring is significant especially also during the mounting/maintenance, because smaller connections rings are easier to mount. When evaluating the installation space, it should also be taken into account that the tool also still has to be applied from the outside. In addition to the installation space, the weight and the manufacturing costs are also significant.

It is an object of the technology disclosed here to reduce or eliminate the disadvantages of the known solutions. This/these task(s) is/are achieved by a connection ring according to embodiments of the invention.

The technology disclosed here thus relates to a connection ring. The connection ring is used for the removable attachment of a fuel supply unit to a motor vehicle tank opening of a motor vehicle tank, for example, a plastic fuel tank or a steel fuel tank.

The connection ring has a ring top side and a ring bottom side. In the mounted condition, the ring bottom side faces the motor vehicle tank opening. In the mounted condition, the ring top side will then face away from the motor vehicle tank opening.

The connection ring has at least one attachment elevation, which projects from the ring top side. In particular, the attachment elevation projects such that, by rotating the connection ring relative to the motor vehicle tank opening, the fuel supply unit can be attached to the motor vehicle tank. In the process, the bayonet mechanism known from the state of the art is used, which will be explained in detail in the following.

The connection ring includes at least one tool engagement region which is constructed such that a tool can contact the connection ring in the tool engagement region so a torque can be transmitted from the tool to the connection ring, in which case at least a section of the tool engagement region and a section of the attachment elevation are spaced at an equal distance from the center M of the connection ring in the radial direction R from the center M. In other words, the tool engagement region and the attachment elevation, viewed in the circumferential direction U of an imagined graduated circle T, are arranged behind one another and in an overlapping manner. In other words, again, the connection ring includes at least one graduated circle T around the center M, which simultaneously extends through the tool engagement region and through the attachment elevation.

As a result of this advantageous embodiment of the connection ring, it becomes possible to eliminate the previous recesses 86 (compare FIG. 2) which were provided comparatively far on the outside at the outer ring 82 (compare FIG. 2). On the whole, the connection ring can be constructed to be smaller and lighter. Furthermore, less space is required for the mounting.

The tool engagement region may be constructed as a recess. The recesses are preferably arranged in the circumferential direction U distributed over the circumference between the attachment elevations. The recesses may have recess edges which project from the ring top side in the axial direction Z, particularly such that a tool can engage behind the edges, for example, even if the connection ring is situated on a motor vehicle tank opening of a fuel tank. Instead of recesses, other suitable interlocking devices would also be possible, such as projections, edges, etc. provided on the ring top side.

The connection ring may have at least one guide, which is provided, at least in regions, on the outer edge of the connection ring. The guide is suitable for guiding a frontal edge of a jaw of a fuel tank in a positioning manner. For the positioning, the outer edge may have a chamfer or a curvature at or in the transition region to a ring bottom side. The connection ring is preferably produced of sheet metal. Furthermore, the connection ring may also be made of another material, for example, of a plastic material. The guide may further have a region projecting from the ring top side. The projecting region may, for example, be a bent sheet metal part.

According to the technology disclosed here, the positioning/guiding of the connection ring relative to the jaws is implemented by a guiding element on the connection ring. The outer ring 81 together with the outer positioning edge 81a can therefore be eliminated. This advantageously reduces the weight, the installation space and material and production expenditures. In addition, the smaller connection rings can be mounted more easily.

At least a section of the guide and a section of the tool engagement region and/or the attachment elevation can be spaced at an equal distance from the center M of the connection ring in the radial direction R from the center M. In other words, viewed in the circumferential direction U, also the guide can be arranged in an overlapping manner and have a common graduated circle T with the tool engagement region and/or the attachment elevation. Such an embodiment is particularly compact.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 5A is a cross-sectional view taken along line B-B of FIG. 4.

FIG. 5B is an enlarged view of a detail of FIG. 5A.

DETAILED DESCRIPTION OF THE DRAWINGS

Figure 1:
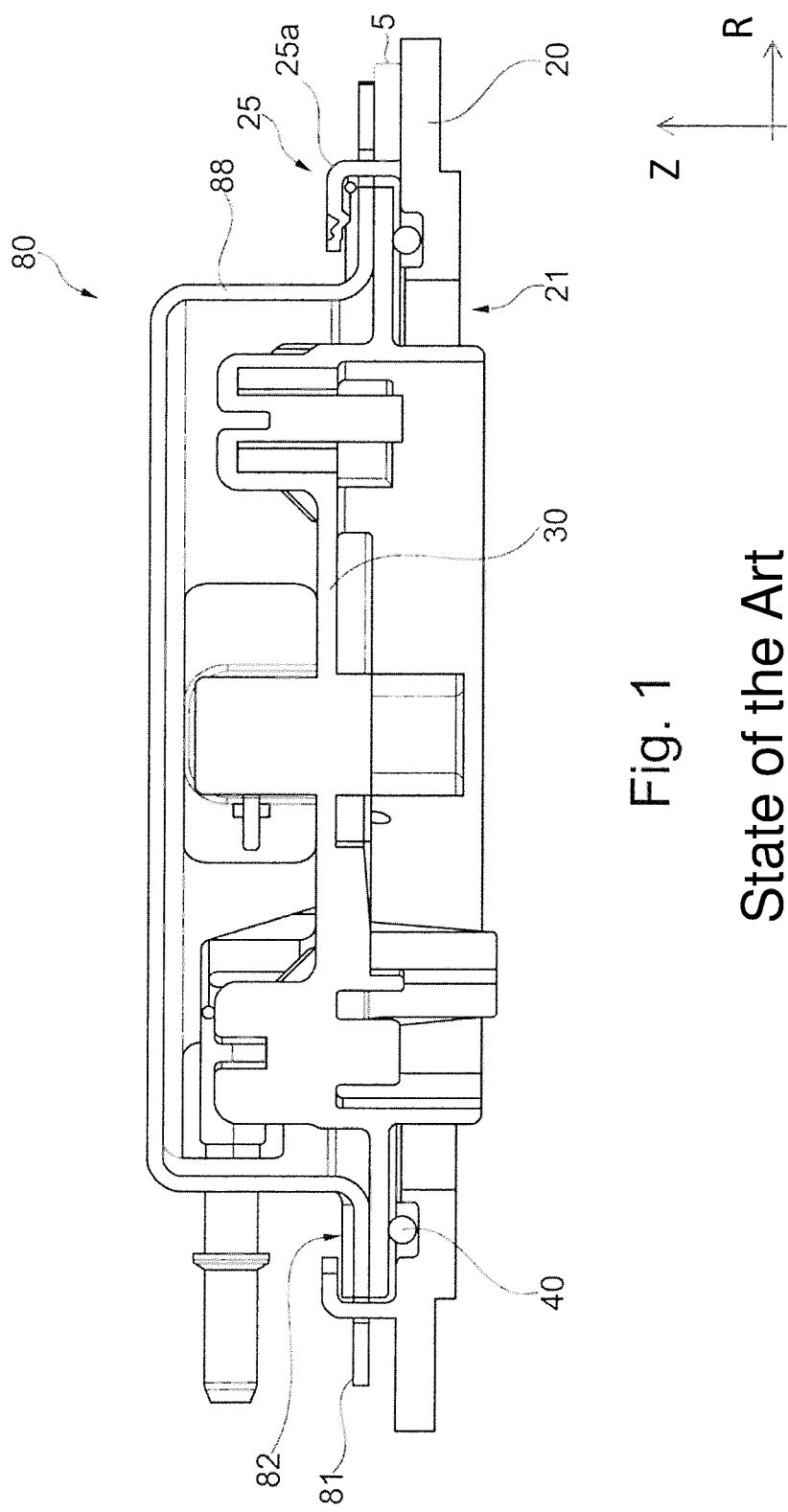
FIGS. 1 and 2 are views of a connection ring 80 according to the state of the art.
Figure 2:
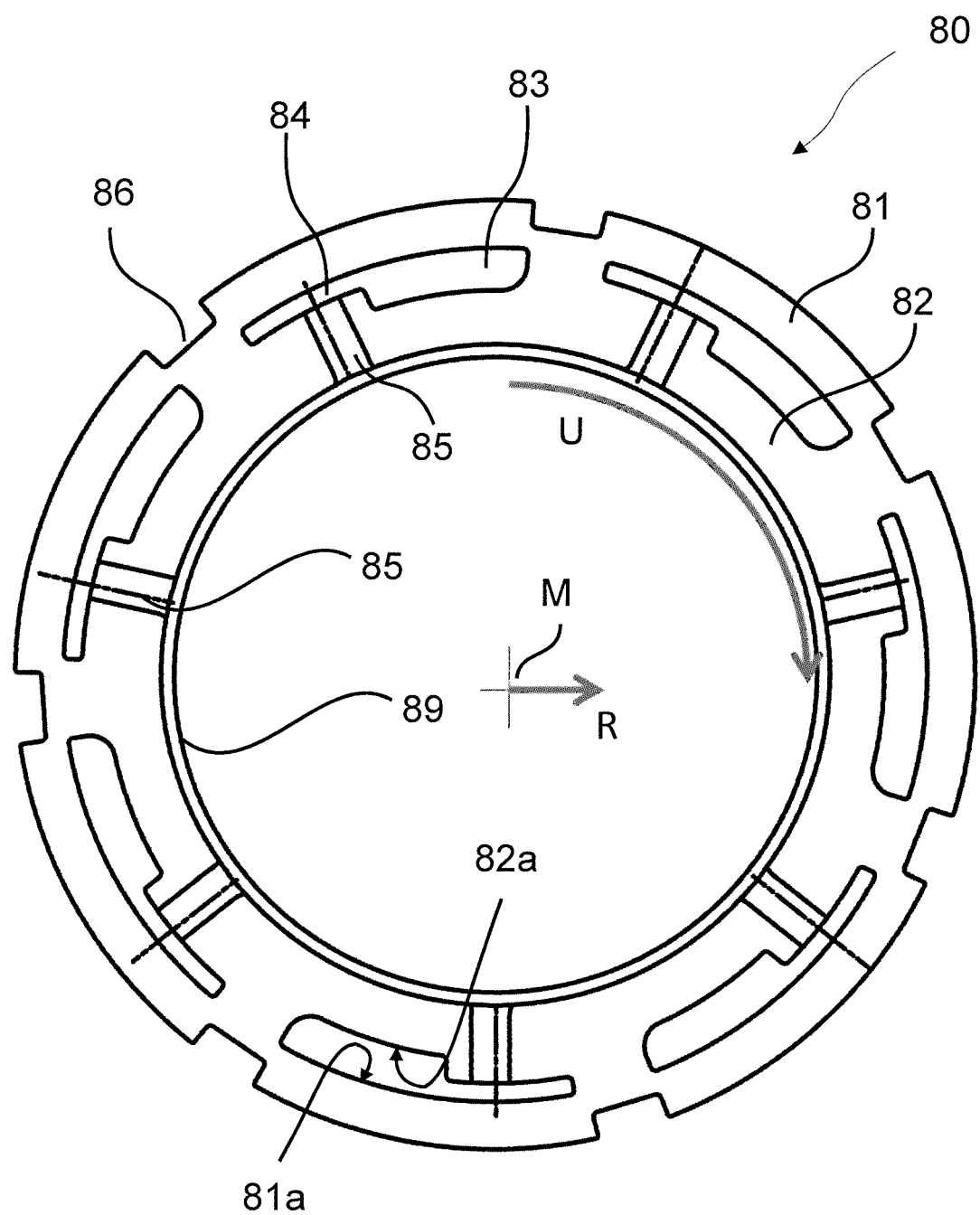
Figure 3:
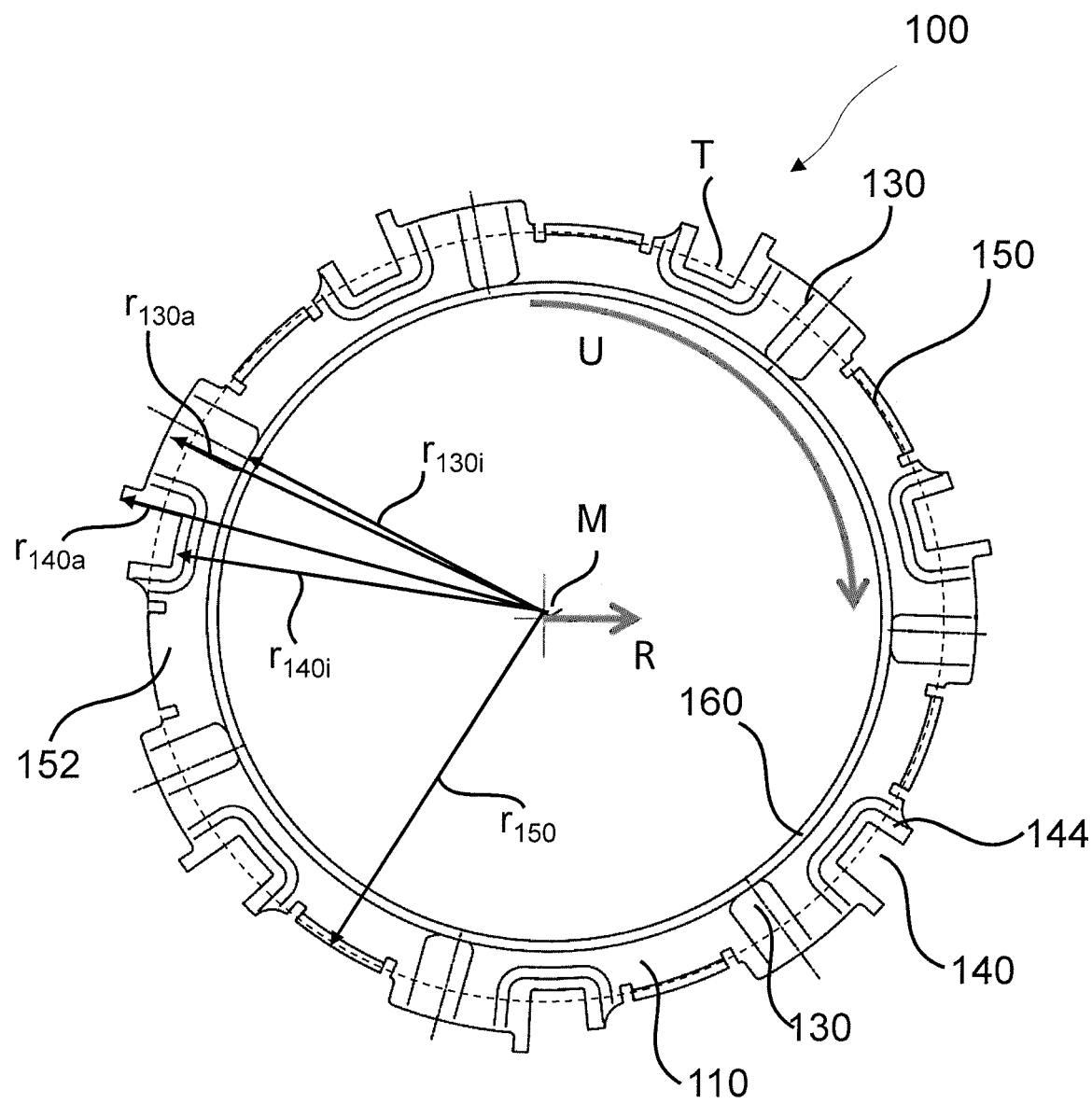
FIG. 3 is a top view of a connection ring 100 according to an embodiment of the invention.

FIG. 3 illustrates a connection ring according to the technology disclosed here. The ring top side 110 forms a plane, from which the attachment elevations 130, the tool engagement regions 140 and the projecting regions of the guides 150 extend upward. They therefore project from the top side of the connection ring facing away from the fuel tank.

The attachment elevations 130 are shaped and arranged exactly as the known elevations 85. The inner edge diameter of the connection ring 100 also corresponds to that of the known solution. The connection ring 100 disclosed here can therefore also be installed in older motor vehicles. The attachment elevations 130 extend from the inner edge of the connection ring 100 in the radial direction R to an outer edge. Here, the shortest distance $r_{130i}$ of the attachment elevation 130 is slightly less than the shortest distance $r_{140i}$ of the tool engagement region 140. In contrast, the longest distance $r_{130a}$ of the attachment elevation 130 is greater than the shortest distance $r_{140i}$ of the tool engagement region 140. In this case, the longest distance $r_{140a}$ of the tool engagement region 140 is greater than the longest distance $r_{130a}$ of the attachment elevation 130. Here, the distance $r_{150}$ of the guide 150 is between the shortest and longest distances of the attachment elevation 130 and the tool engagement region 140.

Here, the tool engagement region 140 is constructed as a recess 140. The recess is raised such that a tool can engage behind the recess 140.

Figure 4:
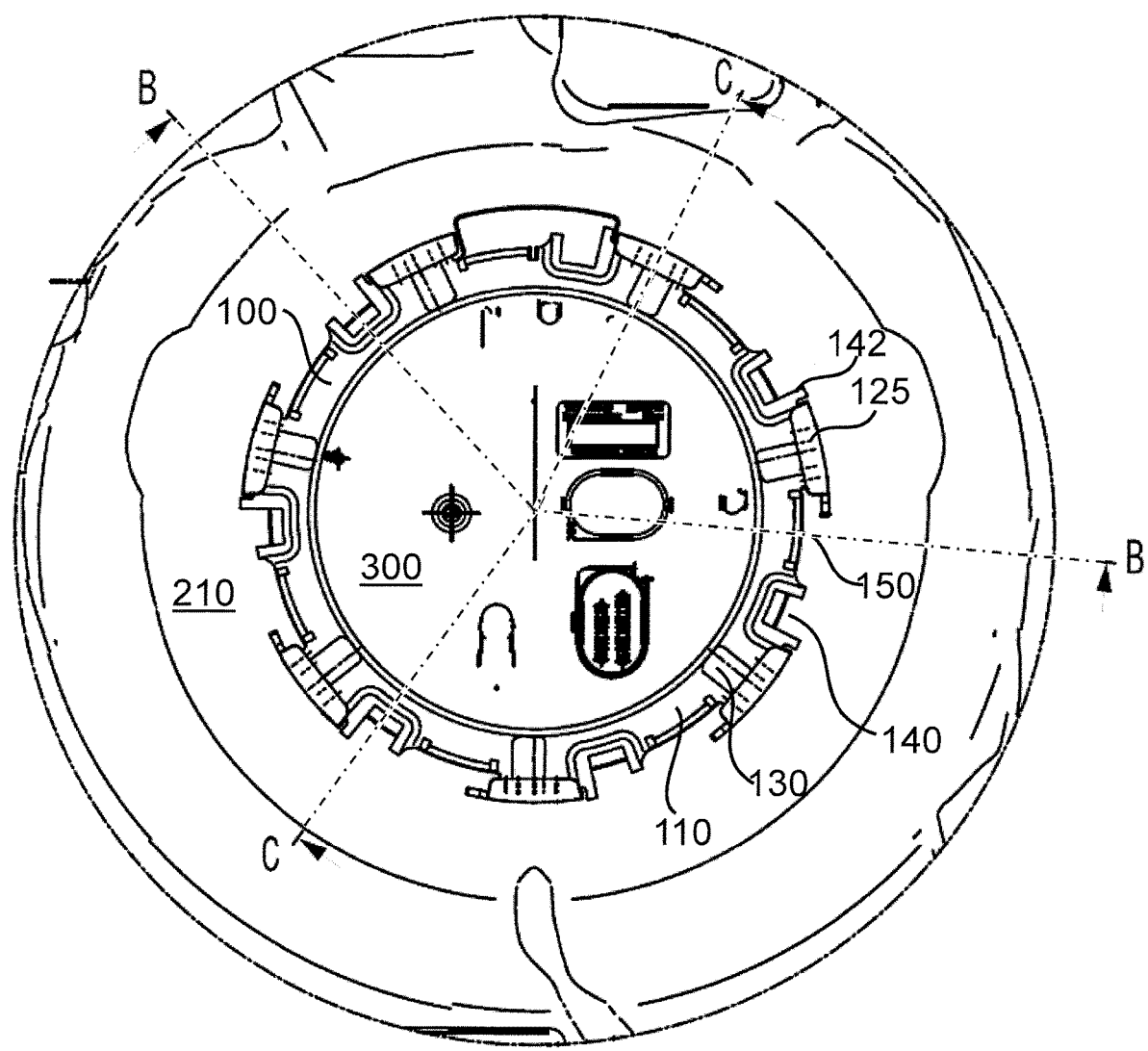
FIG. 4 is a top view of the mounted connection ring 100.

FIG. 4 is a top view of a fuel tank 210 with a motor vehicle tank opening. A fuel supply unit 300 is inserted here into the motor vehicle tank opening of a fuel tank 210, which fuel supply unit 300 is attached by way of a connection ring 100 to the motor vehicle tank 210. The connection ring 100 has tool engagement regions, here recesses 140, and attachment elevations 130. As a result of a rotating movement of the connection ring 100 relative to the motor vehicle tank opening of a fuel tank 210, here the attachment elevations are slid under the jaws 125, whereby the connection ring 100 presses the fuel supply unit 300, which is arranged below the connection ring 100, by way of the seal 400 onto the motor vehicle tank 210. The connection ring 100 further has a rotation stop 142 projecting in the radial direction, which is preferably constructed here in one piece with the recess 140. The conventional connection ring 80 has an outer ring 81 which is arranged radially outside the jaws 25. However, the connection ring 100 disclosed here does not extend beyond the jaws 125. It is more compact and lighter than the known connection ring 80. It can therefore be mounted more easily.

FIG. 5A is a cross-sectional view taken along line B-B of FIG. 4. A seal 400 is arranged between the motor vehicle tank opening of a fuel tank 210 and the connection flange 310 of the fuel supply unit 300. The connection flange 310 is pressed by means of the connection ring 100 by way of the seal 400 onto the motor vehicle tank opening of a fuel tank 210. As illustrated particularly in FIG. 5B, the recess edge 144 is spaced at a distance from the connection flange 310. Between the recess edge 144 and the connection flange 310, a gap s is formed, in which a projection of a tool can engage. The tool, which can be introduced from above, thus from the axial direction, can therefore engage behind the recess. A slipping of the tool can thereby be avoided. Furthermore, FIG. 5A shows the outer edge 150 provided with a curvature, which outer edge 150 is constructed here, for example, as an upwardly bent edge 150. The edge 150 is used as a guide for the jaws 125 during the placing of the connection ring 100, particularly before the rotating of the connection ring.

Figure 6:
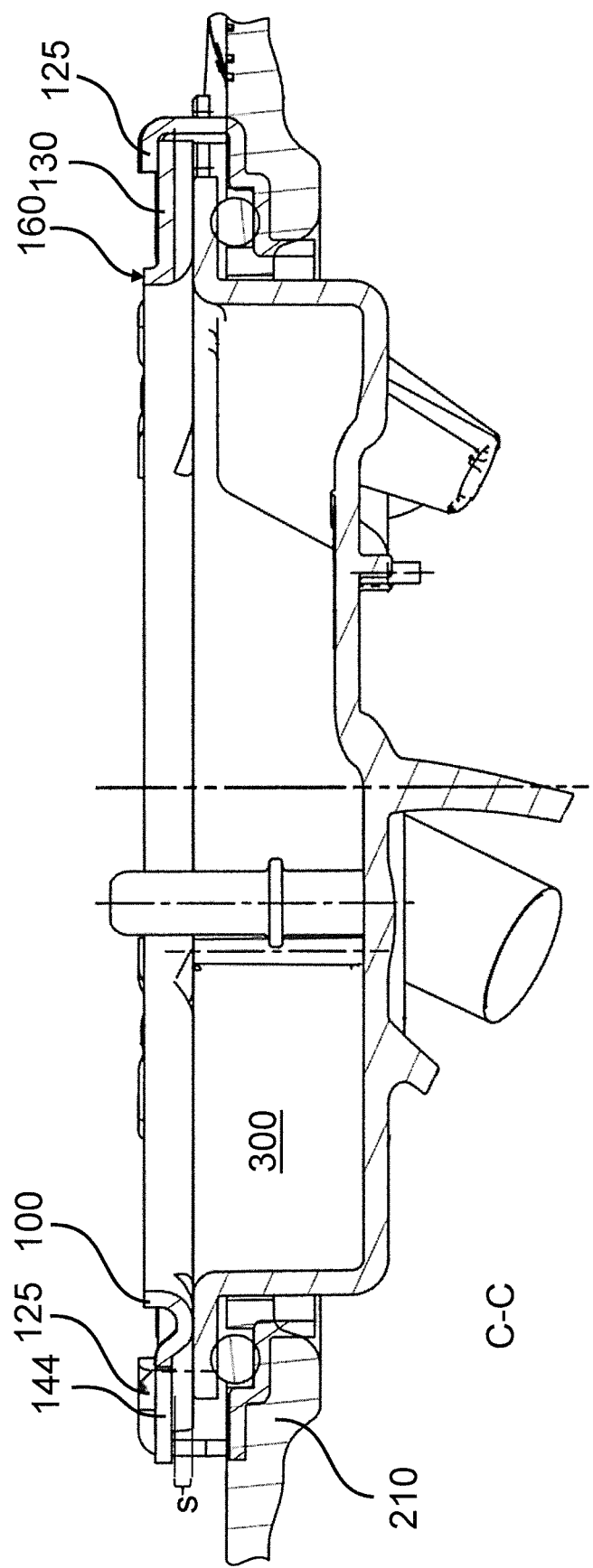
FIG. 6 is a cross-sectional view taken along line C-C of FIG. 4.

FIG. 6 is a sectional view taken along line C-C of FIG. 4. In the left region of the image, the recess 140 is illustrated which corresponds to FIG. 5. In the right region, a cross-section is shown which extends through a jaw 125. The jaw 125 presses the attachment elevation 130 from the connection ring and the connection flange 310 onto the seal 400.

Figure 7:
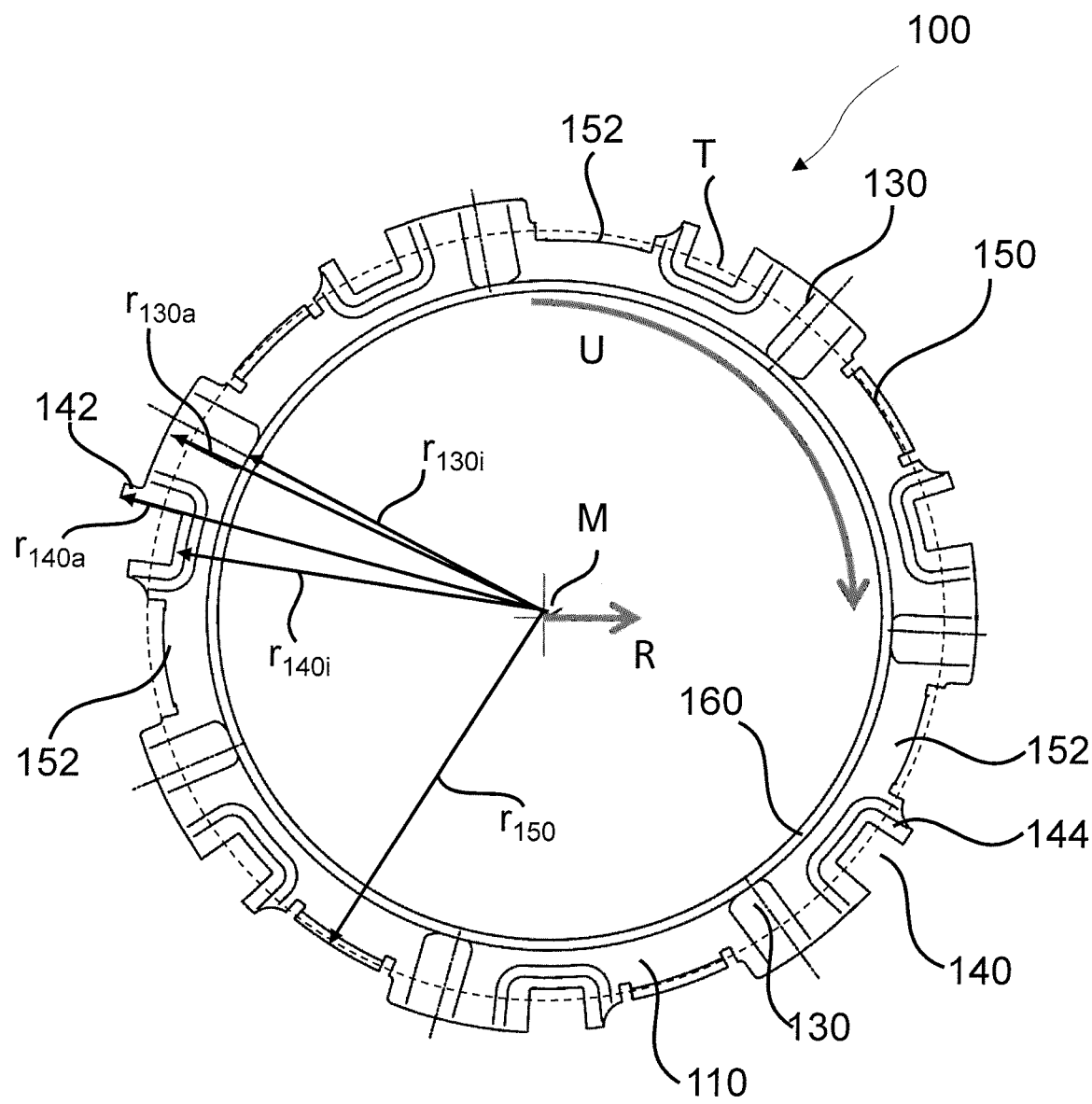
FIG. 7 is a further top view of the connection ring 100.

FIGS. 1 to 6 as a rule illustrate seven attachment elevations, seven tool engagement regions and seven guides. Naturally, also fewer or more of these elements can be provided. FIG. 7 shows such a modification, whose differences can also be applied to FIGS. 1 to 6. Instead of seven guides and/or seven rotation stops, fewer guides and fewer rotation stops are provided in FIG. 7. This can simplify the production process and reduce the weight of the connection ring. In particular, four guides 150 and seven attachment elevations 130 are provided here. Instead of additional guides 150, blind areas 152 are provided here. These blind areas 152 between two adjacent attachment elevations 130 have no guide 150. In comparison to the guides 150, they may be radially set back, as illustrated by means of the graduated circle T shown by a broken line. Advantageously, as in the known solutions, a uniform contact pressure will then be exercised by the seven attachment elevations 130 upon the connection flange 310, in which case simultaneously a sufficient guidance for the jaws 125 will then exist during the placing of the connection ring 100. Advantageously, the blind areas 152 are arranged such that one guide 150 is always constructed between them. Instead of seven rotation stops 142, preferably only one rotation stop 142 may be provided.

In the implementation according to FIGS. 5A, 5B and 6, the upper edge 160 of the connection ring 100 in the installation position closes off approximately flush with the top side of the jaw 125. In a particularly preferred embodiment, the upper edge 160, thus the edge area which closes off the connection ring 100 toward the inside and, in the installation position projects to the outside with respect to the tank, is raised at least in regions such that, in the installation position, it projects beyond the jaw 125. As a result, a faulty mounting of the connection ring can be avoided. In particular, for this purpose a faulty-mounting avoidance element, for example, an upper edge, can be raised by more than 10%, preferably more than 20% or 50% farther from the top side of the connection ring 100 than the attachment elevation(s) 130.

To the extent that the description describes the individual elements in the singular, it simultaneously also comprises the plural. Thus, the description of an attachment elevation, a tool engagement region and/or a guide simultaneously comprises the embodiment with several attachment elevations, tool engagement regions and/or guides.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connection ring for removable attachment of a fuel supply unit on a fuel tank, comprising:
   a ring top side;
   at least one attachment elevation, which projects from the ring top side; and
   at least one tool engagement region, which is constructed to allow a torque to be transmitted from a tool onto the connection ring when the connection ring is operatively placed on the fuel tank, wherein
   at least a section of the tool engagement region and a section of the attachment elevation are at an equal distance from a center of the connection ring in a radial direction from the center, and
   the connection ring has an outermost periphery configured to not extend radially beyond outermost periphery of jaws of the fuel tank.

2. The connection ring according to claim 1, wherein the tool engagement region is a recess.

3. The connection ring according to claim 2, wherein the recess has recess edges behind which the tool can engage.

4. The connection ring according to claim 3, wherein the connection ring comprises at least one guide which, at least in regions, is provided on an outer edge of the connection ring.

5. The connection ring according to claim 4, wherein the outer edge has a chamfer or a curvature for positioning on a ring bottom side.

6. The connection ring according to claim 1, wherein the connection ring comprises at least one guide which, at least in regions, is provided on an outer edge of the connection ring.

7. The connection ring according to claim 1, wherein the connection ring is made of sheet metal.

8. The connection ring according to claim 4, wherein the guide has a region projecting from the ring top side.

9. The connection ring according to claim 5, wherein the guide has a region projecting from the ring top side.

10. The connection ring according to claim 9, wherein the guide is a bent sheet metal part.

11. The connection ring according to claim 4, wherein the guide is a bent sheet metal part.

12. The connection ring according to claim 4, wherein at least a section of the guide and a section of the tool engagement region or the attachment elevation are at an equal distance from the center of the connection ring in the radial direction from the center.

13. The connection ring according to claim 4, wherein at least a section of the guide and a section of the tool engagement region and the attachment elevation are at an equal distance from the center of the connection ring in the radial direction from the center.

14. The connection ring according to claim 1, wherein a faulty-mounting avoidance element projects by more than 10% farther from the top side of the connection ring than the at least one attachment elevation.

15. The connection ring according to claim 1, wherein a faulty-mounting avoidance element projects by more than 20% farther from the top side of the connection ring than the at least one attachment elevation.

16. The connection ring according to claim 1, wherein a faulty-mounting avoidance element projects by more than 50% farther from the top side of the connection ring than the at least one attachment elevation.

17. A system, comprising:
   a fuel tank having an opening about which jaws are circumferentially arranged;
   a connection ring for removable attachment of an apparatus on the fuel tank, wherein the connection ring comprises:
   a ring top side;
   a ring outer periphery;
   at least one attachment elevation, which projects from the ring top side:
   at least one tool engagement region configured to allow a torque to be transmitted from a tool onto the connection ring, wherein
   at least a section of the tool engagement region and a section of the attachment elevation are at an equal distance from a center of the connection ring in a radial direction from the center,
   the jaws of the fuel tank are circumferentially spaced from the at least one tool engagement region, in both an unsecured position of the connection ring and a secured position with the attachment elevation engaging under a respective jaw, when the connection ring is operatively placed on the fuel tank, and
   the ring outer periphery is configured to not extend radially beyond outermost periphery of the jaws of the fuel tank.

* * * * *